(12) United States Patent
Rekers

(10) Patent No.: US 6,186,342 B1
(45) Date of Patent: ***Feb. 13, 2001

(54) SEMIPERMEABLE CAPILLARY HAVING OVERLAPPED STRENGTHENING LAYER

(75) Inventor: Casper Johannes N. Rekers, Hardenberg (NL)

(73) Assignee: Stork Friesland B.V. (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/893,036

(22) Filed: Jul. 15, 1997

(30) Foreign Application Priority Data

Jul. 17, 1996 (NL) .................................................. 1003625

(51) Int. Cl.⁷ ............................. B01D 39/14; B01D 63/02
(52) U.S. Cl. .................... 210/490; 210/488; 210/500.21; 210/500.23
(58) Field of Search ........................ 210/321.87, 500.23, 210/500.21, 321.61, 321.78, 321.79, 321.8, 483, 488, 497.1, 323.2, 321.74, 493.4, 493.1, 490

(56) References Cited

U.S. PATENT DOCUMENTS

| 3,563,889 | 2/1971 | Cooper . |
| 4,039,448 | * 8/1977 | Etani . |
| 4,061,821 | 12/1977 | Hayano .............................. 428/304 |
| 5,039,413 | * 8/1991 | Harwood et al. . |

FOREIGN PATENT DOCUMENTS

| 0 362 917 | 4/1990 | (EP) . |
| 0 684 068 | 11/1995 | (EP) . |

OTHER PUBLICATIONS

GB 2289634, Abstract only, Nov. 29, 1995.*

7007713, Netherlands, Abstract only, Dec. 11, 1970.*

2336962, France, Abstract only, Jul. 29, 1977.*

2236226, Germany, Abstract only, Feb. 14, 1974.*

Pat. Abstracts of Japan vol.003, No. 109(C–058), Sep. 12, 1979 & JP 54 089980 A (Mitsubishi Rayon Co. Ltd.), Jul. 17, 1979.

Pat. Abstracts of Japan vol. 004, No. 190 (c–037), Dec. 26, 1980 & JP 55 129108 A (Nitto Electric Ind Co. Ltd.), Oct. 6, 1980.

Pat. Abstracts of Japan vol.003, No. 109 (C–058), Sep. 12, 1979 & JP 54 087681 A (Ulvac Corp), Jul. 12, 1979.

Pat. Abstracts of Japan vol.005, No. 063(c–052), Apr. 25, 1981 & JP 56 013003 A (Daicel Chem Ind Ltd), Feb. 7, 1981.

* cited by examiner

Primary Examiner—W. L. Walker
Assistant Examiner—Terry K. Cecil
(74) Attorney, Agent, or Firm—Michael D. Bednarek; Shaw Pittman

(57) ABSTRACT

Described is a semipermeable capillary having a tubular semipermeable wall composed of a membrane-forming material (2) and a tubular strengthening layer (1). The tubular strengthening layer includes an elongated tape having mutually overlapped longitudinal edges. The tubular strengthening layer has an open cohesive structure that is embedded in the membrane-forming material whereby the mutually overlapping longitudinal edges are joined together by the membrane-forming material and a continuous phase is formed between the semipermeable wall and the strengthening layer.

3 Claims, 3 Drawing Sheets

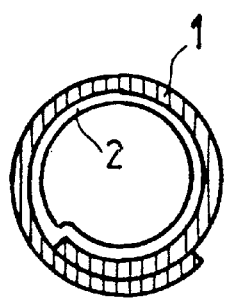
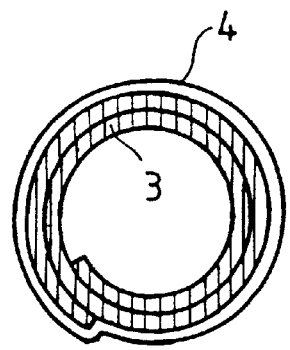
FIG. 1           FIG. 2
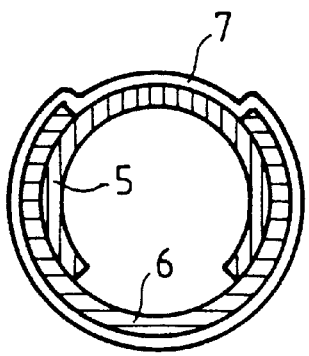
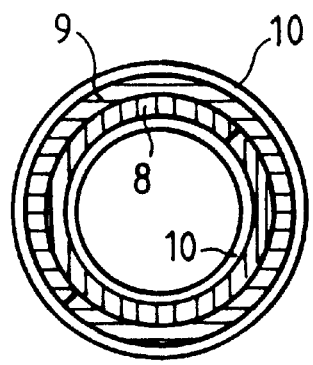
FIG. 3           FIG. 4

SEMIPERMEABLE CAPILLARY HAVING OVERLAPPED STRENGTHENING LAYER

BACKGROUND OF THE INVENTION

The invention relates to a semipermeable capillary comprising a tubular semipermeable wall made of membrane-forming material.

Such a semipermeable capillary is disclosed in DE-A-22 36 226. In the latter, a capillary is described which is composed in its entirety of spun polymer solution. Said spun polymer solution is brought into contact with a coagulation liquid. Depending on the direction of flow of the coagulation liquid through the wall, a very dense skin is produced on the inside or outside, while a porous structure is produced on the other side. The dense skin serves as semipermeable membrane layer and the porous structure as supporting material.

A disadvantage of this known capillary is that it is weak as a result of the lack of a reinforcement. As a result, the semipermeable wall can rapidly become damaged. In order to make such a capillary stronger, the wall thickness can be increased, but this increases the flow resistance appreciably, as a result of which the filtration characteristics decrease considerably.

SUMMARY OF THE INVENTION

The object of the present invention is to provide a reinforced tubular semipermeable capillary in which the above mentioned disadvantages are eliminated.

According to the invention, this object is achieved in that the capillary furthermore comprises a tubular strengthening layer composed of at least one elongated tape which is converted into a tubular shape and of which at least the longitudinal edges mutually overlap, the strengthening layer being joined to the wall and the mutually overlapping tape sections being joined together by the membrane-forming material. The capillary therefore advantageously comprises a semipermeable wall reinforced by a strengthening layer. To obtain a certain strength, the wall thickness can advantageously remain small, as a result of which the filtration characteristics remain high. In addition to forming the reinforced semipermeable wall, the membrane-forming material has yet another function, viz. the mutual joining of the mutually overlapping tape sections. The capillary according to the invention is cheap, rapid and simple to manufacture.

It is pointed out that GB-A-2 289 634 discloses a supported tubular semipermeable membrane. In this case, the membrane comprises a tubular supporting layer made of a nonwoven polyester material and a thin membrane layer applied thereto. In this structure, the tubular supporting layer is formed from an elongated tape, the longitudinal edges being welded to one another by means of ultrasonic welding. In this case, no capillary is involved and the technique described in this document cannot easily be applied to capillaries.

In particular, the tape of the semipermeable capillary according to the invention has an open cohesive structure which is embedded, preferably completely, in the membrane-forming material. The open cohesive structure of the strengthening layer serves as reinforcement of the membrane-forming material. The strengthening layer is completely anchored in the membrane-forming material and, consequently, the joint between the strengthening layer and the wall is very strong. The wall will not quickly become detached from the strengthening layer and will not quickly become damaged in the event of any deformation of the capillary. The strong bond is advantageous, in particular, in backflushing in countercurrent in order to clean the capillary because the flow direction of the semipermeable wall and the strengthening layer is then reversed with respect to that during use. The tape material may be composed, for example, of a strip of nonwoven, woven, knitted or braided material.

Since, according to the invention, at least the longitudinal edges of the tape or tapes converted to a tubular shape mutually overlap, the joint between the mutually overlapping tape sections is advantageously formed by the membrane-forming material itself. Gluing or welding the mutually overlapping tape sections is virtually impossible in the case of capillaries because the anvil which is needed for this purpose and which has to be accommodated in the tubular strengthening layer would have too little mass in the case of such small tube diameters. Furthermore, gluing or welding would appreciably slow down the production rate. In addition, in the case of the joint according to the invention, the joining seam is itself also semipermeable, which keeps the effective semipermeable membrane surface optimum and offers the possibility of making the joining seam in wide form in order to obtain a strong joint. This is in contrast to gluing and welding seams, which are usually impenetrable and are therefore kept as narrow as possible. Advantageously, the internal diameter of the capillary is smaller than, or equal to, 5 mm. A very large reinforced semipermeable wall surface can therefore be obtained for each $m^3$ of volume.

In particular, the overlap is greater than, or equal to, 90°. A very strong joint is therefore obtained between the mutually overlapping tape sections. By making the overlap still greater, in particular greater than, or equal to, 360°, not only is a very strong joint obtained, but also a very stiff tubular strengthening layer made up of a plurality of layers.

It is also possible to provide the semipermeable wall with a top layer having nanofiltration and/or reverse osmosis characteristics. A possible method for doing this is to wet the semipermeable capillary as described above with an aqueous solution of a suitably chosen amine, after which the capillary is brought into contact with a suitably chosen acid chloride dissolved in an organic solvent not miscible with water, for example hexane, to thus form a polyamide top layer having reverse osmosis and/or nanofiltration characteristics by means of boundary surface polymerisation. In this way an advantageous embodiment of the strengthened semipermeable capillary is obtained, which has the capacity to withstand the pressures prevaling during nanofiltration or reverse osmosis.

The invention also relates to a method for manufacturing a semipermeable capillary and also to a device for carrying out such a method.

BRIEF DESCRIPTION OF THE DRAWINGS

The invention will be explained in greater detail by reference to the accompanying drawing, in which:

FIG. 1 is a view in cross-section of a first embodiment of a semipermeable capillary according to the invention;

FIG. 2 is a view corresponding to FIG. 1 of a second embodiment;

FIG. 3 is a view corresponding to FIG. 1 of a third embodiment;

FIG. 4 is a view corresponding to FIG. 1 of a fourth embodiment;

DETAILED DESCRIPTION OF THE PREFERRED EMBODIMENTS

Figure 5:
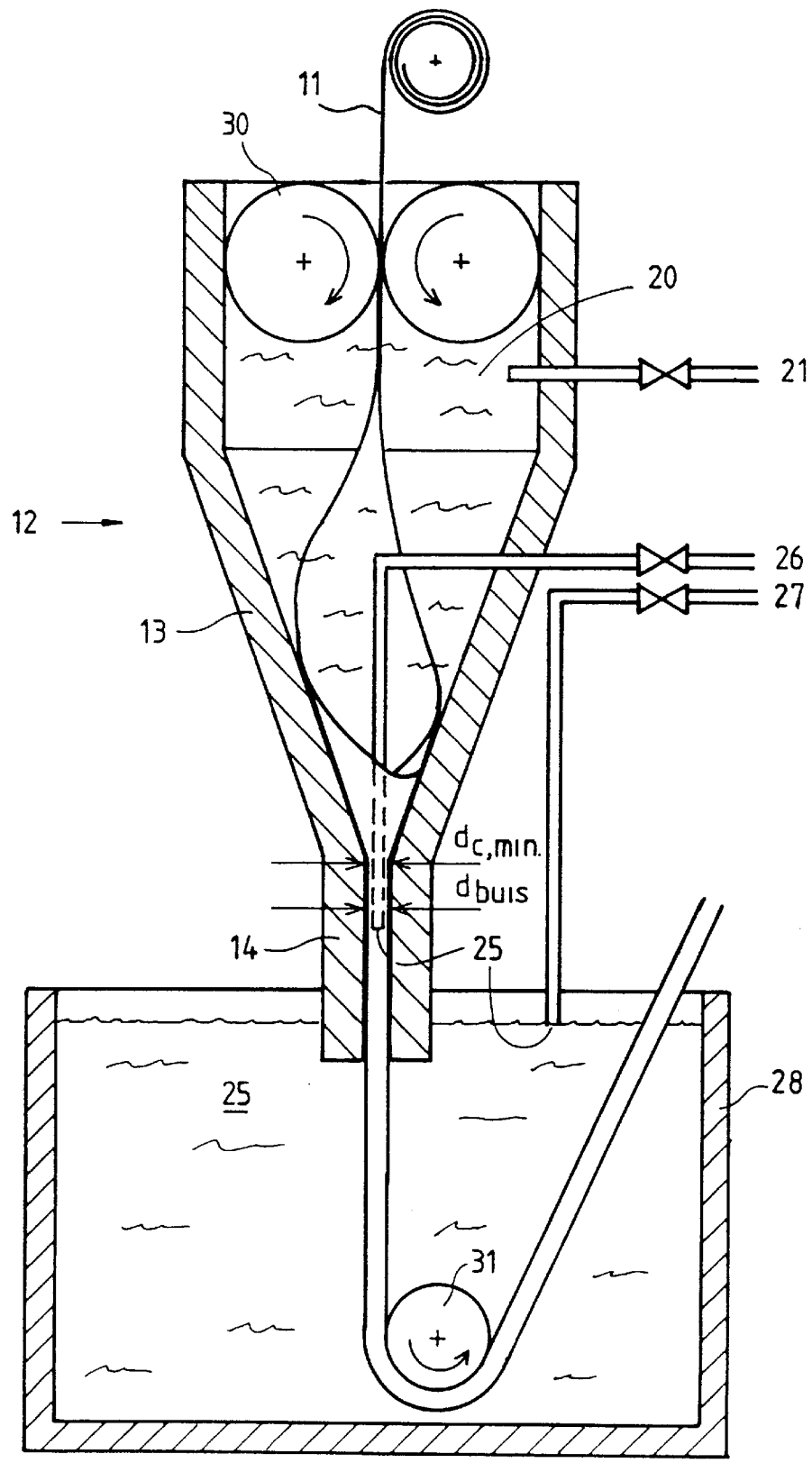
FIG. 5 diagrammatically shows a device for carrying out a method according to the invention.

FIG. 1 shows a semipermeable capillary according to the invention which has a tubular strengthening layer which has on the inside a semipermeable wall 2 composed of membrane-forming material. The strengthening layer has an open cohesive structure and is formed by a tape 1 converted into a tubular shape. The tape 1 converted into a tubular shape overlaps itself over an angle of approximately 90°. According to the invention, the open cohesive structure of the strengthening layer is completely embedded in the membrane-forming material from which the semipermeable wall 2 is also formed. As a result of the embedding, not only is the capillary strengthened and a strong joint formed between the strengthening layer and the semipermeable wall 2, but a joint is advantageously obtained at the same time between the mutually overlapping tape sections. The semipermeable wall thus forms a continuous phase with the strengthening layer, with the result that a reinforced capillary is obtained.

FIG. 2 shows a similar capillary to that in FIG. 1. The strengthening layer is again formed by a tape 3 converted into a tubular shape. However, the overlap is now approximately 360° and the semipermeable wall 4 is provided on the outside. As a result of the large overlap, the strengthening layer is made up over the entire section of two layers. The open cohesive structure of the strengthening layer is again embedded in the membrane-forming material. A very stiff capillary and a very strong joint between the mutually overlapping tape sections are thus obtained.

In the variant shown in FIG. 3, the strengthening layer is formed by two tapes 5, 6 which have been converted together into a tubular shape. This time the semipermeable wall 7 is provided on the outside. The overlaps between the two tapes 5, 6 is again approximately 90° for the two longitudinal edges.

FIG. 4 shows a similar capillary to that in FIG. 3. The strengthening layer is again formed by two tapes 8, 9 converted to a tubular shape. However, the overlap is now complete and the semipermeable wall 10 is provided on the inside and outside. Just as in FIG. 2, the strengthening layer is made up of two layers over the entire section.

The invention is not limited to the embodiments of the capillary shown in FIGS. 1–4. The overlap may, for example, be smaller or greater. The strengthening layer may also be formed from more than two tapes.

The membrane-forming material is composed, in particular, of a polymer solution which coagulates in a coagulating liquid such as water, but may also be composed, for example, of a polymer containing oil which coagulates as a result of a temperature reduction. The polymer solution may be formed from polysulphone, polyvinylidene fluoride, polyether sulphone or polyacrylonitrile or any other polymer suitable for forming the semipermeable wall. The strengthening layer is formed by at least one tape which is converted to a tubular shape and may be made up of a nonwoven fibrous fleece material, a knitted material, a woven material or a braided material, or any other suitable material for forming the strengthening layer which has an open cohesive structure. The internal diameter of the capillaries according to the invention is preferably in the range between 1 and 5 mm.

FIG. 5 shows a device which is suitable for manufacturing in a continuous process an embodiment of a reinforced semipermeable capillary according to the invention in which the strengthening layer is formed from one tape which is converted to a tubular shape and has an open cohesive structure. In the device tape 11 is passed through a shaping chamber 12. The elongated tape 11 is fed from a roll and is shown in side view at the top of FIG. 5, that is to say viewed along the longitudinal edge. The shaping chamber 12 comprises a conical part 13 and a tubular part 14. Since the tape is moved downwards in the conical part 13, which becomes increasingly narrower, the initially flat tape 11 is rolled up in tubular shape. The tape 11 is rolled up in tubular shape in such a way that at least its longitudinal edges mutually overlap. During the rolling-up, the tape 11 is impregnated with a membrane-forming material 20. Since this impregnation takes place at the same time as the rolling-up, in particular the membrane-forming material situated between the mutually overlapping tape sections is forced through the open cohesive structure with the result that the latter is well and completely impregnated with it. The conical part 13 is filled for this purpose with the membrane-forming material 20, which is supplied via a line 21. Advantageously, the membrane-forming material 20 functions as a lubricant during the rolling-up of the tape 11. The tubular strengthening layer thus formed and impregnated with membrane-forming material is then passed through the tubular part 14 and brought into contact therein with a coagulation liquid 25. As a result, the membrane-forming material 20 coagulates and, depending on the dimensions of the conical part 13 and the tubular part 14, a semipermeable wall is produced on the inside and/or outside of the tubular strengthening layer. In addition, a very strong joint is produced between the mutually overlapping tape sections of the tape 11 because the membrane-forming material 20 which is situated in the open cohesive structure of the tape 11 and, in particular, at the position of the mutually overlapping tape sections cures.

In the device shown in FIG. 5, the semipermeable wall is provided substantially on the inside of the tubular strengthening layer. This is brought about because the inside diameter $d_{tube}$ of the tubular part 14 is of equally large construction as the smallest internal diameter $d_{c,min}$ of the conical part 13. The tape 11 rolled up in tubular form in the conical part 13 to form said smallest internal diameter is situated, as a result, with its outside substantially against the internal wall of the tubular part 14. Consequently, little or no space is left free at the outside of the tubular strengthening layer, as a result of which the formation of an unbroken semipermeable layer is prevented at that point. In addition, the coagulation liquid 25 is first supplied on the inside of the tubular strengthening layer impregnated with membrane-forming material. This takes place via a line 26 which extends from the conical part 13 into the top of the tubular part 14 and, specifically, as far as into the shaped tubular strengthening layer. The thickness of the semipermeable wall to be formed is determined by the difference in diameter of the external diameter of the line 26 and the internal diameter of the tubular strengthening layer formed in the conical part 13. As a result, a semipermeable wall composed of the membrane-forming material 20 is formed on the inside of the tubular strengthening layer impregnated with membrane-forming material. Only after the tubular strengthening layer has emerged from the tubular part 14 does its outside come into contact with coagulation liquid 25. For this purpose, a vessel 28 which is filled with coagulation liquid 25 via a line 27 is situated underneath the shaping chamber 12.

Figure 6:
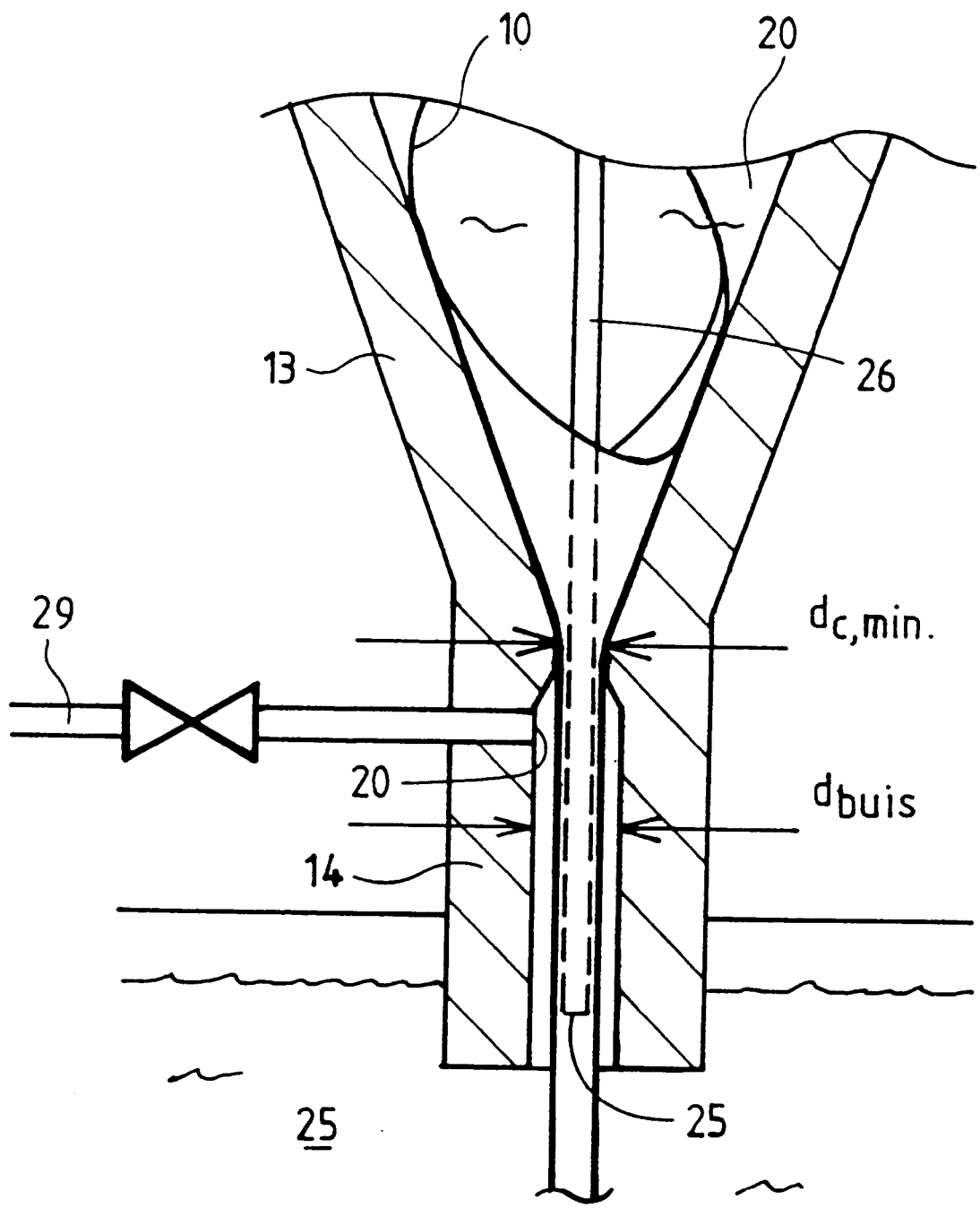
FIG. 6 shows a detail on an enlarged scale of a variant of the device shown in FIG. 5.

In the device shown in FIG. 6, the semipermeable wall is substantially provided on the outside of the tubular strengthening layer. This is brought about because the internal diameter $d_{tube}$ of the tubular part 14 is of larger construction than the smallest internal diameter $d_{c,min}$ of the conical part 13. Consequently, space is left free at the outside of the tubular strengthening layer, with the result that a continuous semipermeable wall is able to form at that point. In particular, additional membrane-forming material 20 is provided on the outside of the tubular strengthening layer via a supply line 29. The line 26 has in this case an external diameter which is virtually equal to the internal diameter of the tubular strengthening layer formed in the conical part 13. Consequently, little or no space is left free on the inside of the tubular strengthening layer, as a result of which the formation of a continuous semipermeable wall is prevented at that point. The line 26 is provided in such a way that it debouches downstream of the supply line 29 and also serves to ensure that the tubular strengthening layer cannot be pressed together as a consequence of the supply of additional membrane-forming material 20 via the supply line 29.

If the semipermeable wall is to be provided both on the inside and the outside, a device can be used which is a combination of the devices shown in FIGS. 5 and 6.

As can be seen in FIG. 5, the tape 11 is moved downwards in the shaping chamber 12 by driving guide rollers 30 situated at the top in the shaping chamber 12 and/or a guide roller 31 situated underneath the shaping chamber 12. The guide rollers 30 are provided in the shaping chamber 12 in such a way that they close off the latter at the top. It is consequently advantageously possible to bring the membrane-forming material 20 to a certain pressure above atmospheric pressure, as a result of which the membrane-forming material 20 can impregnate the open cohesive tape 10 well. With a sufficiently high pressure, even the line 29 can be omitted in the embodiment of FIG. 6; the membrane-forming material then in fact does not need to be supplied separately but is forced through the open cohesive structure of the tubular strengthening layer towards the space between the tubular part 14 and the tubular strengthening layer.

The manufacture of a reinforced semipermeable capillary in which the strengthening layer is made up of two tapes can be carried out with the aid of a device in which the shaping chamber comprises two conical parts placed in or behind one another. This embodiment of the capillary can also be manufactured with a device as shown in FIGS. 5 and 6. Both tapes then need to make use of mutually oppositely situated wall parts of the conical part 13. Instead of one tape feed, two separate tape feeds are now needed. Furthermore, it is necessary to monitor precisely how the two tapes move into one another so that they mutually overlap in the correct way.

A reinforced semipermeable capillary can be obtained with the device according to the invention in a very simple, fast and cheap way. Instead of the device described above, many other embodiments are also possible for manufacturing reinforced semipermeable capillaries according to the invention. Thus, for example, instead of the shaping chamber, one or more converters which force the tape into a tubular shape and are placed one behind the other can also be considered instead of the shaping chamber. Furthermore, the impregnation of the tape can also be carried out before or after the conversion to a tubular shape.

What is claimed is:

1. A semipermeable capillary comprising the following:
    a tubular strengthening layer composed of at least one elongated tape having longitudinal edge sections, said tape being converted into a tubular shape with at least said longitudinal edge sections mutually overlapping; and
    a tubular semipermeable wall composed of membrane-forming material supported by said strengthening layer;
    in which said capillary has a fine bore permitting capillarity and has an internal diameter smaller than or equal to 5 mm, and
    in which said mutually overlapping edge sections have an overlap greater than, or equal to 90°;
    said mutually overlapping edge sections having been joined together by said membrane-forming material in a simultaneous formation process as the formation of and joining with said strengthening layer of said semipermeable wall by said same membrane-forming material,
    wherein said tape has an open cohesive structure which is embedded in the membrane-forming material and wherein a continuous phase is formed between the semipermeable wall and the strengthening layer.

2. Semipermeable capillary according to claim 1, wherein the overlap is greater than, or equal to, 360°.

3. A semipermeable capillary comprising the following:
    a tubular strengthening layer composed of at least one elongated tape having longitudinal edge sections, said tape being converted into a tubular shape with at least said longitudinal edge sections mutually overlapping; and
    a tubular semipermeable wall composed of membrane-forming material supported by said strengthening layer;
    in which said capillary has a fine bore permitting capillarity and has an internal diameter smaller than or equal to 5 mm, and
    said mutually overlapping edge sections having been joined together by said membrane-forming material in a simultaneous formation process as the formation of and joining with said strengthening layer of said semipermeable wall by said same membrane-forming material,
    wherein said tape has an open cohesive structure which is embedded in the membrane-forming material and wherein a continuous phase is formed between the semipermeable wall and the strengthening layer.

* * * * *